Nov. 18, 1941.   J. A. MARCHAND   2,263,096
GRAVITY MEASURING INSTRUMENT
Filed Sept. 2, 1938   2 Sheets-Sheet 1

Inventor
Joseph A. Marchand
By J. Vincent Martin
and
Ralph R. Browning.
Attorneys Nov. 18, 1941.                J. A. MARCHAND                2,263,096
                         GRAVITY MEASURING INSTRUMENT
                          Filed Sept. 2, 1938            2 Sheets-Sheet 2
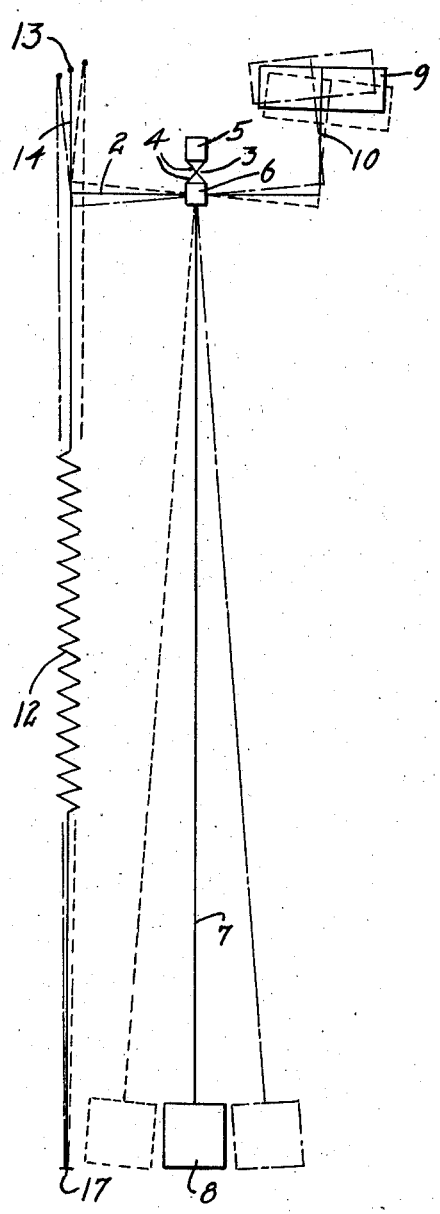
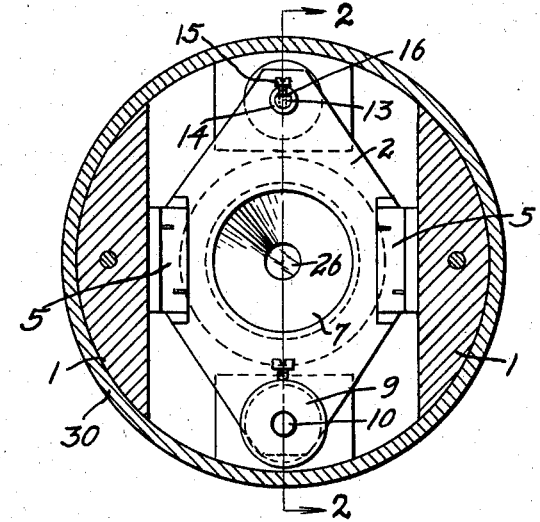
Fig.3.
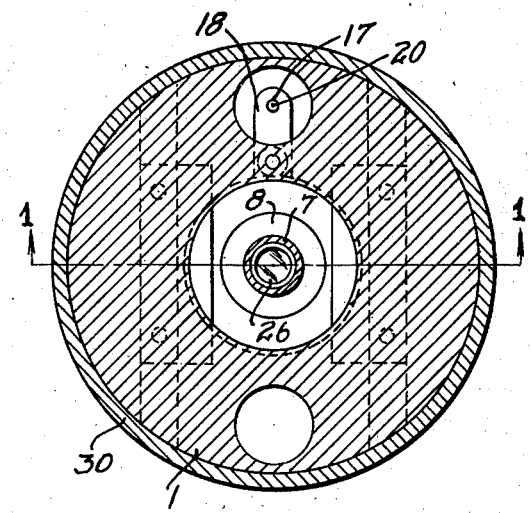
Fig.4.
Fig.6.
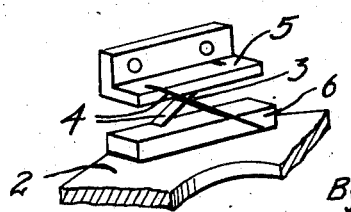
Fig.5.
Inventor
Joseph A. Marchand.
By J. Vincent Martin
and
Ralph R. Browning.
Attorneys Patented Nov. 18, 1941

2,263,096

UNITED STATES PATENT OFFICE 2,263,096

GRAVITY MEASURING INSTRUMENT

Joseph A. Marchand, Houston, Tex., assignor of fifty-five per cent to Bailey Balken, Houston, Tex.

Application September 2, 1938, Serial No. 228,173

5 Claims. (Cl. 265—1.4)

This invention relates to a gravity measuring instrument, and it has special reference to an instrument of this character, the purpose of which is to measure the force of gravity at various terrestrial points in order to take readings from which may be determined, with reasonable certainty, the subsurface formations occurring at such terrestrial points.

Surveys of this character have been found to be of great value in locating petroleum bearing and other subsurface formations, and the instrument of the invention is well adapted to this purpose.

One object of the invention is to provide a gravity measuring instrument of relatively simple, compact and rugged construction, and of small size, whereby it may be moved from point to point readily and without danger of injury to its sensitive parts.

Another object is to provide for ready adjustment of the sensitive parts of the instrument to accommodate them to the taking of readings at points where marked variations in the force of gravity occur.

A further object is to provide a construction wherein the scale of the instrument, and parts associated therewith, are protected against accumulation of dust and foreign matter and their accuracy in taking readings thereby enhanced.

Another object is to provide means for producing a readable image of the scale of the instrument thereby making possible the reading of the scale free from possibility of inaccuracy or obscurity which might be incident to direct reading of the scale.

A still further object of the invention is to provide means whereby the sensitivity of the instrument may be so adjusted that the movement of its moving parts will be appropriately accommodated to the scale from which readings are taken, change of this adjustment for marked differences in the force of gravity at various terrestrial points being provided for, as hereinbefore indicated.

An additional object is to provide for attachment of the counterbalancing resilient means or spring of the instrument in such a manner as to guard against error directly referable to temperature changes.

With the foregoing and other objects and advantages in view, the invention contemplates a gravity measuring instrument of what may be termed a pendulum-actuated balance type, including a pivoted beam carrying a mass or weight and counterbalancing means therefor, both said weight and counterbalancing means being adjustable and the counterbalancing means preferably being in the form of a tensioned resilient member, a pendulum carried by said beam and oscillatable therewith in response to the influence of gravity upon said mass or weight, the pendulum preferably being a weighted tube, scale means having associated light projecting means for casting its image in position to be read with respect to the position of the pendulum, means for use in reading said scale means, and means for adjusting said weight and counterbalance means to effect desired oscillation characteristics in said pendulum, all as will be explained hereinafter more fully and finally claimed.

In the accompanying drawings illustrating the invention, in the several figures of which like parts are similarly designated:

Fig. 3 is a transverse sectional elevation taken on the line 3—3 of Fig. 1;

Fig. 4 is a transverse sectional elevation taken on the line 4—4 of Fig. 1;

Fig. 5 is a perspective view of the beam pivot; and

Fig. 6 is a schematic view illustrating the variations in the effective lever arms of the beam as determined by adjustment of the weight and counterbalance means thereof, respectively.

Figures 1, 2:
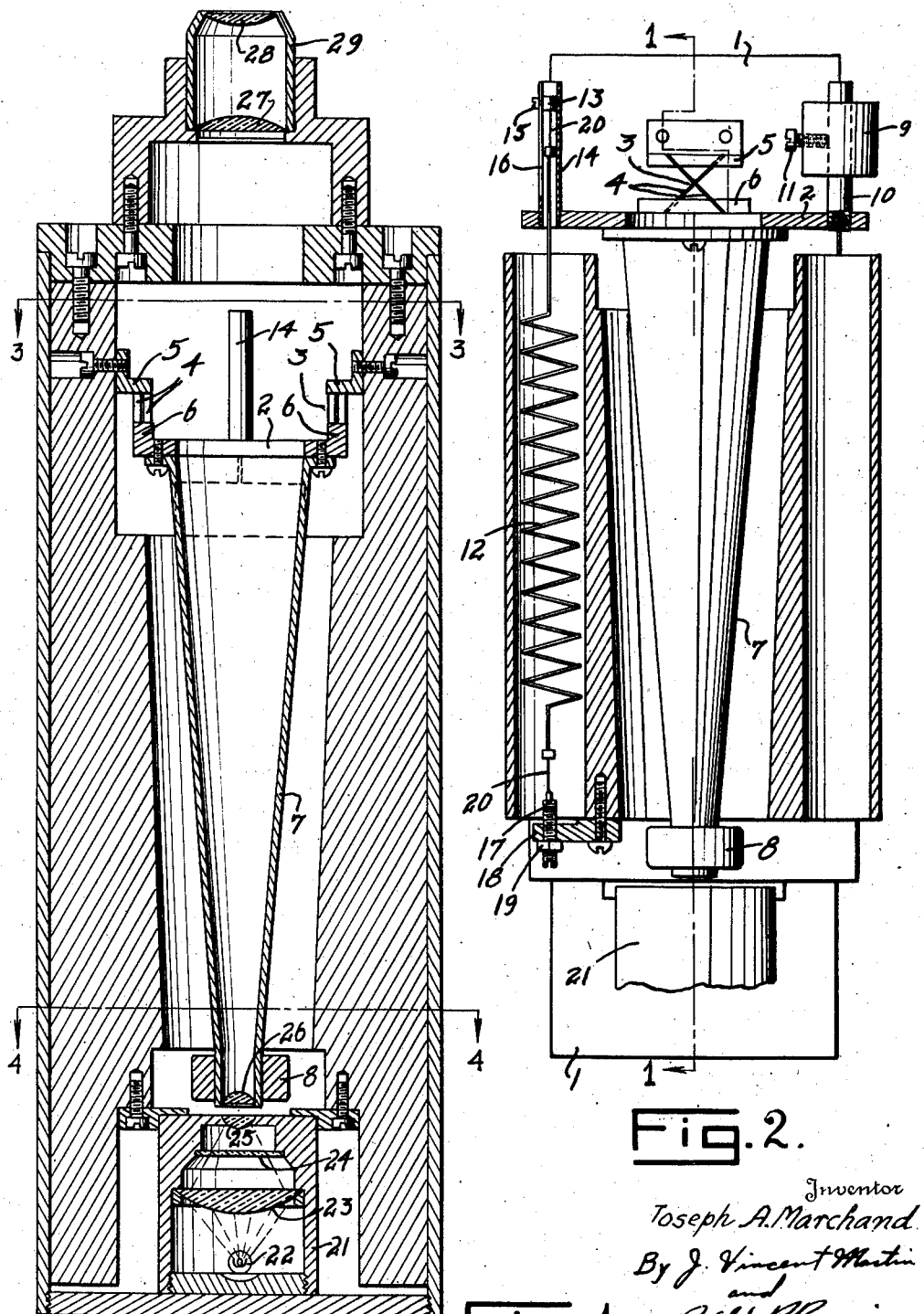
Fig. 1 is an axial sectional elevation of an instrument embodying the features of the invention, taken on the lines 1—1 of Figs. 2 and 4.
Fig. 2 is an axial sectional elevation of parts of the instrument, taken at right angles to the section of Fig. 1 and upon the line 2—2 of Fig. 3.

The operative parts of the instrument are carried by a relatively heavy mounting member 1 of substantially cylindrical form and of sufficient bulk and such material as normally to prevent excessive rapid temperature changes in the instrument. This member is suitably formed to receive and support a beam 2 mounted on appropriate pivotal supports 3 which are preferably of the crossed ribbon type shown, the ribbons 4 of each support being crossed and having their respective ends secured in slots in the support brackets 5 and 6. These ribbons are preferably at substantially right angles to each other and make equal angles with the brackets 5 and 6. They are also preferably arranged so that their point of intersection will be substantially midway between the brackets 5 and 6.

Normal to the axis of the pivotal supports 3 and rigidly depending from the beam 2 is a pendulum member 7 preferably in the form of a tubular truncated cone and carrying at its lower end a stabilizing weight 8. This pendulum swings in response to the force of gravity acting upon a weight 9 adjustable longitudinally of a post 10 and fixed in adjusted position thereon by a set screw 11, the post 10 being carried adjacent to one end of the beam 2.

Resilient counterbalance means, preferably in the form of a tension spring 12, are connected between a point adjacent to the opposite end of the beam 2 and a fixed part of the mounting member 1. Adjustment of the point of connection of the spring 12 with the beam 2 is afforded by a block 13 axially slidable in a tube 14 carried by the beam 2, fixing of desired adjustment being accomplished by a cap screw 15 carried by the block 13 and extending through a slot 16 in the tube 14 against the walls of which it may be tightened. Provision for adjusting the tension of the spring is afforded by a threaded stem 17 axially slidable in a fixed bracket 18 and forming an abutment for an adjusting nut 19 engaging the thread of the stem 17.

It will be noted that both ends of the spring 12 are connected with their respective adjusting means by filamentary members 20 of sufficient tensile strength to answer their purpose as connectors, but of such little body as to be incapable of appreciable transfer of heat between the spring and the parts to which it is connected, and to provide a highly flexible coupling without appreciable elastic hysteresis or mechanical stress.

Fixed within the member 1 in axial alignment with the normal vertical axis of the tubular pendulum 7 is the scale apparatus, including a housing 21 in which are assembled in predetermined optical arrangement a lamp 22, condensing lens 23, translucent scale plate 24 and image lens 25, with which latter cooperates a viewing lens 26 carried by the pendulum 7 and optically associated with the lenses 27 and 28 of the relatively fixed eye piece 29, the lens 27 preferably bearing a hair line, as may also the lens 26, so that the extent of movement of the pendulum with relation to the image of the scale plate projected between the lenses 25 and 26 may easily be read.

It will be noted that the scale plate 24 is enclosed dust-tight within the housing 21, and hence its workings will not be blurred or confused by particles of dust or foreign matter which might otherwise settle upon it. If any dust or other foreign matter should settle upon the lenses 25 and 26 it will be apparent that the projected image of the scale will not be obscured thereby as any such foreign matter will be out of focus with respect to the scale plate and will not appear in the image thereof.

To determine the sensitivity of the instrument, the pendulum 7 must first be adjusted to its slowest constant speed of oscillation by the raising or lowering of the mass or weight 9 and of the point of attachment of spring 12 by raising or lowering the block 13, or both may be raised or lowered to satisfy the equilibrium period of the entire system.

The sensitivity referred to is the sensitivity of the instrument to variations in the force of gravity exerted on the mass or weight 9. Such variations may be very slight for the purpose of ascertaining the presence or absence of petroleum or the like in the subsurface formations by reason of the structure of such formations. In other words, the pull of gravity varies with the subsurface structure.

To explain further, if the point of connection at 13 were directly at the outer end of the beam 2, and the mass or weight 9 directly at the other end of the beam, the adjustable supporting means 14 and 10, therefore being omitted, then the period of oscillation of the pendulum about its pivots 3 would be much shorter and the instrument would therefore be less sensitive and much harder to read.

By adjusting the point of connection 13 and the mass or weight 9 to vary the lever arms from the axis of the pivots 3, the period of oscillation is made much longer and the instrument is therefore more sensitive and easier to read.

Fig. 6 illustrates diagrammatically the variations in the effective lever arms afforded by adjustments of the point of connection 13 and the mass or weight 9.

After the adjustments of these members upon their supports 14 and 10 to attain the desired sensitivity of the whole system of the instrument, the mounting member and associated parts are enclosed in a suitable case 30 and any further adjustments found necessary are made by actuation of the nut 19 to alter the position of the threaded stem 17 and the tension of the spring 12, thus to compensate for any changes, plus or minus, in the force of gravity acting upon the mass or weight 9 which might be encountered in the field after leaving the laboratory.

For example, if the force of gravity or the mass or weight 9 increases or decreases, it is necessary, in order to bring the instrument into proper balance, to either decrease or increase the tension of the spring 12.

It will be obvious that such adjustments are necessary due to the limited range of the scale and the consequent limited measurable swing of the pendulum. Hence for those changes in the force of gravity which would move the pendulum out of the readable scale range, adjustment must be made to appropriately limit the swing of the pendulum. Thus, when the nut 19 is adjusted, the operator observes the scale and notes the number of units on the scale through which the pendulum is swinging. Thereby he is enabled to determine the effect of the adjustment and to know the relationship between readings taken prior and subsequent to the adjustment. The readings taken subsequent to adjustment are either added to or subtracted from the number of units of the adjustment depending upon the sense of the adjustment.

It will be apparent, therefore, that, in use, after proper adjustments are made, readings of the relative force of gravity for any particular location may be made by viewing through the eye piece 29 and the lens 26 of the tubular pendulum the range of movement of the pendulum with relation to the graduations of the image of the scale.

The crossed ribbon pivotal supports will provide for the support of the pendulum with a minimum of friction, and without interference due to accumulation of dust and dirt, and will tend to compensate for what might otherwise result in changed reading due to temperature changes. Thus if the temperature rises and the ribbons expand tending to lower the pivotal axis as well as the pendulum, this will be compensated for by the simultaneous expansion of the material of the brackets 5 and 6 between the ends of the respective ribbons, which latter expansion would tend to raise the pivotal axis and the pendulum.

Various changes and modifications are considered to be within the spirit of the invention and the scope of the following claims.

What I claim is:

1. In a gravity measuring instrument, a beam pivoted substantially midway of its length, a pendulum secured to and rigidly depending from said beam in vertical alignment with its pivot, a gravity responsive mass carried adjacent to one end and above said beam, counterbalance means connected adjacent to the other end and above said beam, and means for individually adjusting the vertical position of said mass and the point of connection of said counterbalance means with respect to said beam and its pivot to thereby vary the period of oscillation of said pendulum.

2. In a gravity measuring instrument, a relatively fixed part, a beam pivoted substantially midway of its length to said fixed part, a tubular pendulum secured to and rigidly depending from said beam in vertical alignment with its pivot, a gravity responsive mass carried adjacent to one end of said beam, a tubular support member attached to the other end of the beam and extending upwardly therefrom, an anchor member movable within said support member, a tension spring having its opposite ends attached to the fixed part and the anchor member, and means for individually adjusting the position of said mass and the anchor member with respect to the pivot of said beam to thereby vary the period of oscillation of said pendulum.

3. In a gravity measuring instrument, a relatively fixed part, a beam pivoted substantially midway of its length to said fixed part, a pendulum secured to and rigidly depending from said beam in vertical alignment with its pivot, a support member attached to the beam adjacent one end and extending upwardly therefrom, a mass carried by said support member, counterbalance means including a tubular support member attached to the beam adjacent the other end thereof, an anchor member mounted in said tubular member, a tension spring having one of its ends connected to said anchor member and its opposite end connected to said fixed part, means for individually adjusting the position of said mass upon the first mentioned support member and said anchor member within the tubular member, and means for varying the tension of said spring by adjustment of its connection with the fixed part, to thereby vary the period of oscillation of said pendulum.

4. In a gravity measuring instrument, a tubular pendulum member carrying a lens at its lower swinging end, scale means arranged adjacent to the lower swinging end of said pendulum member, a lens system for projecting an image of said scale means in position to be read in relation to the movement of said swinging end and means for viewing said image through said tubular pendulum member and the lens carried at the end thereof.

5. In a gravity measuring instrument, an eye piece and means for projecting a scale image in axial alignment, a tubular pendulum member in axial alignment when at rest with said eye piece and image projecting means and having its swinging end movable with respect to said scale image, said eye piece furnishing a means of viewing said scale image through said pendulum member to read the extent of oscillation of said swinging end.

JOSEPH A. MARCHAND.